US009021558B2

(12) United States Patent
Zlatarev

(10) Patent No.: US 9,021,558 B2
(45) Date of Patent: Apr. 28, 2015

(54) USER AUTHENTICATION BASED ON NETWORK CONTEXT

(71) Applicant: Stephan Zlatarev, Sofia (BG)

(72) Inventor: Stephan Zlatarev, Sofia (BG)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 13/746,995

(22) Filed: Jan. 22, 2013

(65) Prior Publication Data

US 2014/0208382 A1 Jul. 24, 2014

(51) Int. Cl.
G06F 7/04 (2006.01)
G06F 21/31 (2013.01)
G06F 21/60 (2013.01)

(52) U.S. Cl.
CPC .............. *G06F 21/31* (2013.01); *G06F 21/602* (2013.01)

(58) Field of Classification Search
USPC ......................................................... 726/1–5
See application file for complete search history.

(56) References Cited

U.S. PATENT DOCUMENTS

| 8,190,740 | B2 | 5/2012 | Stienhans et al. | |
| 8,290,998 | B2 | 10/2012 | Stienhans et al. | |
| 8,572,366 | B1* | 10/2013 | Yadav | 713/154 |
| 2005/0015601 | A1* | 1/2005 | Tabi | 713/182 |
| 2006/0015358 | A1* | 1/2006 | Chua | 705/1 |
| 2009/0276838 | A1* | 11/2009 | Bennett et al. | 726/7 |
| 2009/0328139 | A1* | 12/2009 | Kitamura et al. | 726/2 |
| 2010/0169497 | A1 | 7/2010 | Klimentiev et al. | |
| 2011/0214176 | A1 | 9/2011 | Burch et al. | |
| 2011/0225467 | A1 | 9/2011 | Betzler et al. | |
| 2011/0258333 | A1 | 10/2011 | Pomerantz et al. | |
| 2012/0002814 | A1* | 1/2012 | Wei et al. | 380/270 |
| 2012/0110650 | A1 | 5/2012 | Biljon et al. | |
| 2012/0117142 | A1 | 5/2012 | Lu | |
| 2012/0170753 | A1* | 7/2012 | Pandrangi et al. | 380/286 |

(Continued)

FOREIGN PATENT DOCUMENTS

WO WO-2013034108 A1 3/2013

OTHER PUBLICATIONS

Jana et al., "Dynamic User Credential Management in Grid Environment," TENCON 2005 2005 IEEE Region 10 2005 , pp. 1-6.*
Xiaolong et al., "Comparison of open-source cloud management platforms: OpenStack and OpenNebula," Fuzzy Systems and Knowledge Discovery (FSKD), 2012 9th International Conference on 2012 , pp. 2457-2461.*

(Continued)

*Primary Examiner* — Luu Pham
*Assistant Examiner* — Roderick Tolentino
(74) *Attorney, Agent, or Firm* — Schwegman Lundberg & Woessner, P.A.

(57) ABSTRACT

Example systems and methods of user authentication based on network context are presented. In one example, a command to authenticate a user of a computing device is received in response to a request transmitted from the computing device to access a computing solution. In response to the command, a determination is made whether a network address corresponding to the request matches at least one network address associated with a protected network. Based on the network address corresponding to the request not matching the at least one network address associated with the protected network, authentication of the user is initiated at an identity provider corresponding to the computing solution. Otherwise, based on the network address corresponding to the request matching the at least one network address associated with the protected network, authentication of the user is delegated to an identity management system located within the protected network.

15 Claims, 8 Drawing Sheets

(56) References Cited

U.S. PATENT DOCUMENTS

| | | |
|---|---|---|
| 2012/0297075 A1 | 11/2012 | Rojvongpaisal |
| 2013/0046894 A1 | 2/2013 | Said et al. |
| 2013/0067085 A1* | 3/2013 | Hershko et al. ............... 709/225 |
| 2013/0067550 A1 | 3/2013 | Chen et al. |
| 2013/0067582 A1 | 3/2013 | Donovan et al. |
| 2013/0174239 A1 | 7/2013 | Kim et al. |
| 2013/0198384 A1 | 8/2013 | Kirsch et al. |
| 2013/0227099 A1* | 8/2013 | Hinton et al. ................ 709/223 |
| 2014/0068743 A1* | 3/2014 | Marcus et al. .................... 726/8 |

OTHER PUBLICATIONS

"Security Assertion Markup Language—Wikipedia, the free encyclopedia", [Online]. Retrieved from the Internet: <URL: http://en.wikipedia.org/w/index.php?title=Security_Assertion_Markup_Language&printa...>, (Accessed Oct. 16, 2012), 4 pgs.

Pollock, Wayne, "PAM Tutorial", © 2005-2012 by Wayne Pollock, [Online]. Retrieved from the Internet: <URL: http://content.hccfl.edu/pollock/AUnix2/PAM-Help.htm>, (Accessed Oct. 16, 2012), 14 pgs.

* cited by examiner

USER AUTHENTICATION BASED ON NETWORK CONTEXT

TECHNICAL FIELD

The present disclosure relates generally to data processing and, in an example embodiment, to user authentication based on network context.

BACKGROUND

Corporate entities and other organizations often provide information technology (IT) computing solutions, such as accounting applications, engineering tools, sales and marketing programs, human resource applications, and so on, via an in-house or internal corporate communication network to their employees or members. In some examples, such computing solutions may be provided as part of an overall enterprise resource planning (ERP) system. However, as Internet-based, or "cloud-based," solutions hosted outside a corporate network have become more popular and prevalent due to the reduced infrastructure costs and enhanced scalability typically associated therewith, many organizations now offer at least a portion of their computing solutions to their members or employees via the cloud.

As is the case with corporate network computing solutions, organizations typically control access to cloud-based computing solutions by way of user authentication to ensure that only employees, or a specific subset of employees, may access a particular computing solution. In some examples, authentication of employees attempting to access a cloud-based solution from a computing device located within a corporate network is provided by a corporate identity management system located within the corporate network. However, under circumstances in which an employee is located outside the corporate network, such as when the employee is at home or on a business trip, the computing solution may be unable to authenticate the employee using the same corporate identity management system due to the firewall normally employed to protect the corporate network from malevolent external access. In such cases, the employee may access the cloud-based solutions via a different entry point that provides authentication by a cloud-based identity provider, such as by way of a web password or other authentication mechanism. As a result, the employee normally determines which entry point to use for a particular cloud solution based on whether the computing device of the employee is located within or external to the corporate network.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the an that embodiments of the inventive subject matter may be practiced without these specific details. In general, well-known instruction instances, protocols, structures, and techniques have not been shown in detail.

Figure 1:
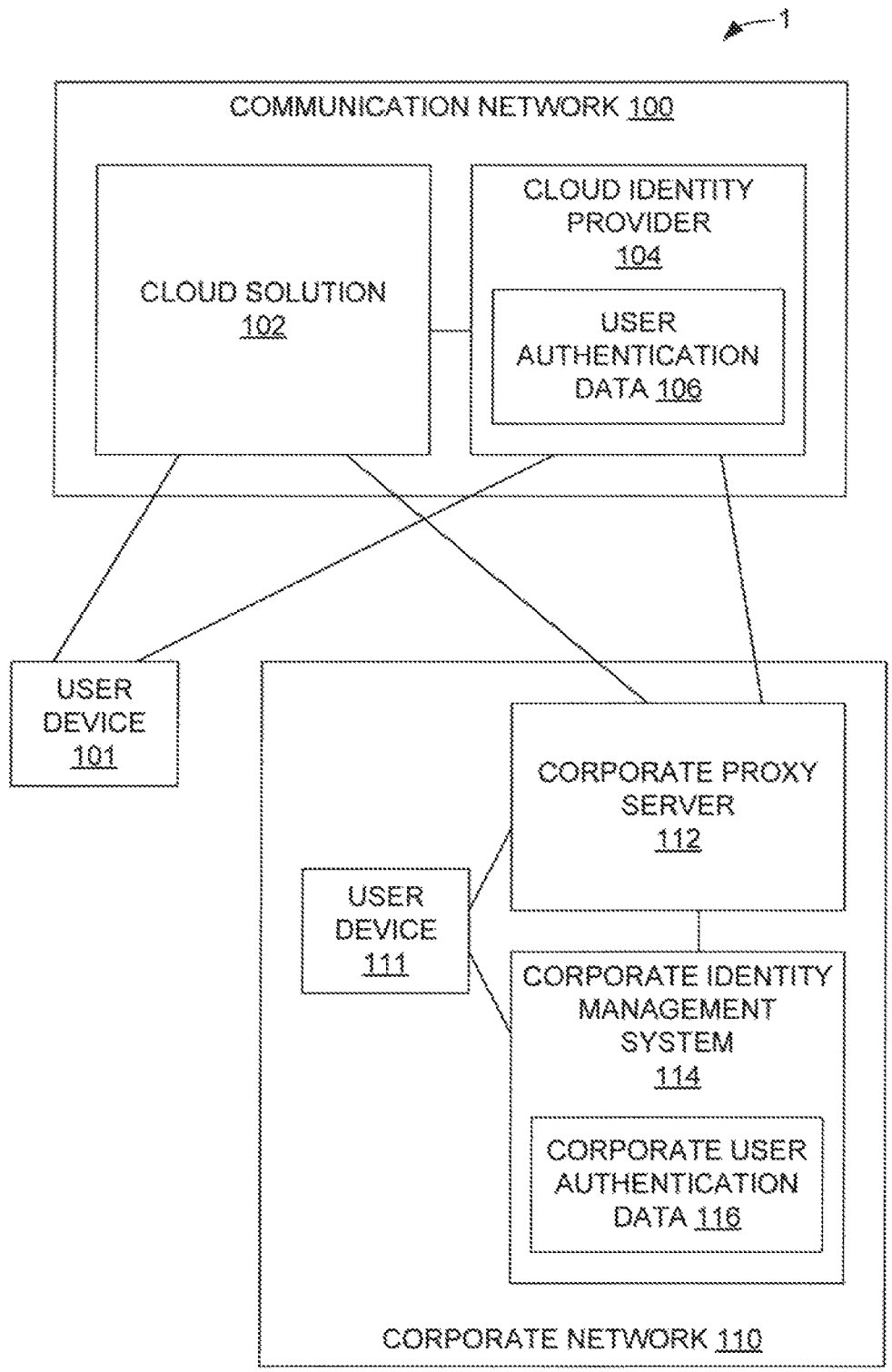
FIG. 1 is a block diagram of an example communication system in which user authentication based on network context may be performed.

FIG. 1 is a block diagram of an example communication system 1 in which user authentication based on network context, as described in the various examples presented herein, may be performed. In the communication system 1, a communication network 100 may host a cloud solution 102 and a cloud identity provider 104. Examples of the communication network 100 may include, but am not limited to, the Internet or other wide-area network (WAN), or some portion thereof, such as one or more communication systems operated by public or private cloud service providers. In general, the term "cloud" is employed herein to refer to remote access to, and delivery of, services, such as software-based services, to one or more parties over a communication network, such as the communication network 100 of FIG. 1.

The cloud solution 102 may be any solution or service, such as a software application, software development system, and the like, which may be accessed by one or more users via the communication network 100. Further, the cloud solution 102 may be available to the public in general, to specific corporations or other organizations, or only to one or more members of a specific organization or group of organizations. In one example, the cloud solution 102 may include one or more applications, solutions, or services typically provided within an ERP system. In some implementations, the cloud solution 102 may be provided within the environment of an overall larger service provided by a cloud service provider, such as Infrastructure-as-a-Service (IaaS), Platform-as-a-Service (PaaS), and Software-as-a-Service (SaaS).

The cloud identity provider 104 provides the cloud solution 102 with user authentication capability to control access to the cloud solution 102. In some examples, the cloud identity provider 104 may provide user authentication for other cloud solutions in addition to the cloud solution 102, possibly including cloud solutions supplied by other cloud service providers. As described in greater detail below, the cloud identity provider 104 may communicate with, and operate in conjunction with, one or more additional cloud identity providers (not depicted in FIG. 1) to authenticate one or more users. In some examples, the cloud identity provider 104 may authenticate a user by requesting one or more items of identifying information from the user, such as a name, username, password, personal identification number (PIN), birth date, Social Security Number (SSN), phone number, email address, home address, and the like. Such identifying information may be stored as user authentication data 106 at the cloud identity provider 104 (as shown in FIG. 1) or in another data store in the communication network 100 that is accessible by the cloud identity provider 104. In one example, the user authentication data 106 may include, for each potential user, an indication of the particular cloud solutions 102, or portions thereof, that are deemed accessible by the associated user. The cloud identity provider 104 may, upon receiving authentication data from the user, compare that data against the user authentication data 106 stored at the cloud identity provider 104 to determine whether to grant the user access to the cloud solution 102.

Also illustrated in FIG. 1 is a corporate network 110 including at least one user device 111, a corporate proxy server 112, and a corporate identity management system 114. The corporate network 110 may be just one example of a type of protected network in which access to the protected network from networks or communication devices outside the protected network is controlled or limited, such as by way of the corporate proxy server 112. In some implementations, access to the protected network may be controlled by way of a firewall or similar software or hardware operating within or in conjunction with the corporate proxy server 112. In one example, the corporate network 110 is a communication network constructed and operated primarily for the use of employees, contractors, and others associates of a particular corporate entity. In other examples, the corporate network 110 may be a network operated for the benefit of some organization or entity not specifically associated with any particular corporation, such as a school district. While the corporate network 110, as shown in FIG. 1, depicts only a single user device 111, corporate proxy server 112, and corporate identity management system 114, multiple ones of any of these components may be employed within the corporate network 110 in other implementations, but are not shown in FIG. 1 to simplify and focus the following discussion. The corporate network 110 may span the premises of a single corporation or organization site, or may span multiple separate sites, such as different sites located in separate cities, states, or countries.

The corporate proxy server 112 may facilitate access of the user device 111 to one or more systems or solutions provided via the communication network 100, including, but not limited to, the cloud solution 102 and the cloud identity provider 104. More generally, in some implementations, the corporate proxy server 112 may act as an intermediary system that receives and forwards requests from the user device 111 and other user devices in (or coupled with) the corporate network 110 for resources hosted in systems in or attached to the communication network 100. In some examples, the corporate proxy server 112 may also host, or communicate with, one or more firewalls, as indicated above, each of which may include hardware and/or software that monitors and controls incoming and/or outgoing traffic between the corporate network 110 and the communication network 100.

The corporate identity management system 114 may include, or maintain access to, corporate user authentication data 116, such as names, usernames, passwords, contact information, and like, as enumerated above with respect to the user authentication data 106 of the cloud identity provider 104. In one example, the corporate user authentication data 116 may also include an indication of the specific solutions to which the user may gain access, including one or more cloud solutions 102 available in the communication network 100 and/or one or more local solutions supplied within the corporate network 110. Given this information, the corporate identity management system 114 may authenticate users of devices (e.g., user device 111) coupled to, or located within, the corporate network 110 for access to both cloud solutions 102 as well as solutions located within the corporate network 110. In some examples, the user device 111 is located within the corporate network 110 by virtue of being coupled via a direct wired or wireless connection to a router or other communication device constituting the corporate network 110. In other implementations, the user device 111 may be coupled with the corporate network 110 via a virtual private network (VPN) or other secure connection from a location remote to a physical area covered by the corporate network 110 to be considered as being located within the corporate network 110.

FIG. 1 also depicts a user device 101 which is associated with the corporate network 110 but is located external to the corporate network 110. When located external to, and thus not connected to, the corporate network 110, the user device 101 may communicate with the cloud solution 102 and the cloud identity provider 104 via the communication network 100 to gain access to the cloud solution 102.

Figure 2:
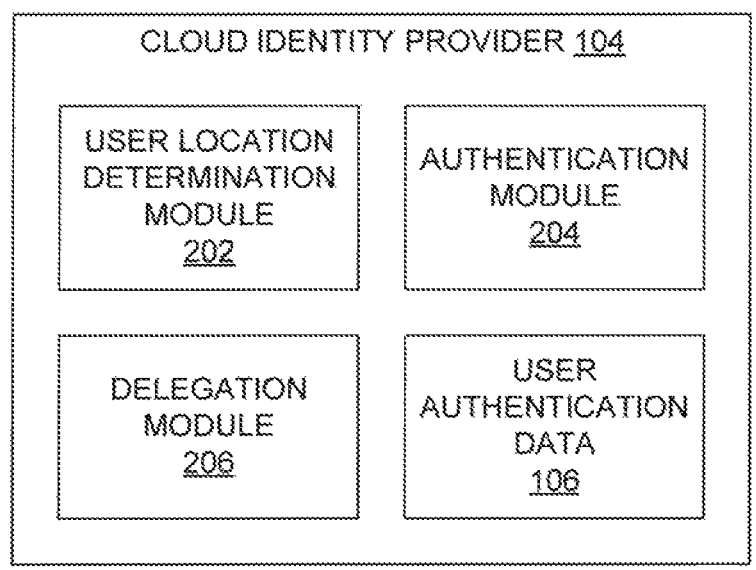
FIG. 2 is a block diagram of an example cloud identity provider of FIG. 1.

FIG. 2 is a block diagram of an example of the cloud identity provider 104 of FIG. 1. As shown, the cloud identity provider 104 may include a user location determination module 202, an authentication module 204, and a delegation module 206. Other modules or components other than those depicted in FIG. 2, such as, for example, one or more communication interfaces, may be employed in the cloud identity provider 104 to aid in performing the various functions associated with the cloud identity provider 104 in some implementations. Such components are not depicted in FIG. 2 or described further herein to simplify and focus the following discussion.

The user location determination module 202 determines the location of a particular user device being employed by a user attempting to access the cloud solution 102. In one example, the user location determination module 202 receives the network address, such as the Internet Protocol (IP) address, of the particular user device to determine if the user device is located within, or connected to, the corporate network 110. If the user device (e.g., user device 111) is located within the corporate network 110, the user location determination module 202 may employ the delegation module 206 to delegate authentication of the user for the cloud solution 102 to a component of the corporate network 110, such as the corporate identity management system 114. Otherwise, if the user device (e.g., user device 101) is not located within, or communicatively coupled with, the corporate network 110, the user location determination module 202 may employ the authentication module 204 to authenticate the user for the cloud solution 102 directly.

To authenticate the user under these latter circumstances, the authentication module 204 may compare information received from the associated user device 101, such as a username, password, and/or the like, and compare that information against the user data authentication data 106 stored in, or accessed by, the cloud identity provider 104 to determine if the user is to be permitted access to the cloud solution 102, or some portion thereof. As is described more fully below, the authentication module 204 may perform this authentication entirely within the cloud identity provider 104, or possibly employ other cloud identity providers (not shown in FIG. 1) of the communication network 100 to accomplish this task.

As indicated above, if the user location determination module 202 determines that the user device of interest (e.g., user device 111) is located within, or connected to, the corporate network 110, the delegation module 206 may delegate the authentication of the user to the corporate identity management system 114. For example, the delegation module 206 may provide information regarding the identity of the user device of interest to the corporate identity management system 114 via the corporate proxy server 112. The corporate identity management system 114 may then communicate with the user device 111 to authenticate the user associated with the user device 111. If the user is authenticated for accessing or using the cloud solution 102, the corporate identity management system 114 may then communicate with the delegation module 206, which, in turn, may communicate with the cloud solution 102 to indicate the authentication of the user.

In another example, if the user location determination module 202 determines that the user device 111 is located within, or connected to the corporate network 110, the delegation module 206 may delegate the authentication of the user to the corporate identity management system 114 delegation module 206 by communicating with the user device 111 via the corporate proxy server 112 to redirect the user device 111 to the corporate identity management system 114. As a result, the user device 111 may then communicate directly with the corporate identity management system 114 to initiate and undergo the authentication process. Once the corporate identity management system 114 successfully authenticates the user of the user device 111, the corporate identity management system 114 may provide the user device 111 with information indicating the authentication, which the user device 111 may then provide to the delegation module 206 via the corporate proxy server 112. In turn, the delegation module 203 may communicate with the cloud solution 102 to indicate the successful authentication of the user. In yet other examples, the communications between the cloud solution 102, the cloud identity provider 104, and the corporate identity management system 114 may be directed through the user device 111, as is described in greater detail below. As a result, the delegation module 206 need not communicate directly with the corporate identity management system 114 through the corporate proxy server 112 in order to delegate authentication to the corporate identity management system 114.

Figure 3:
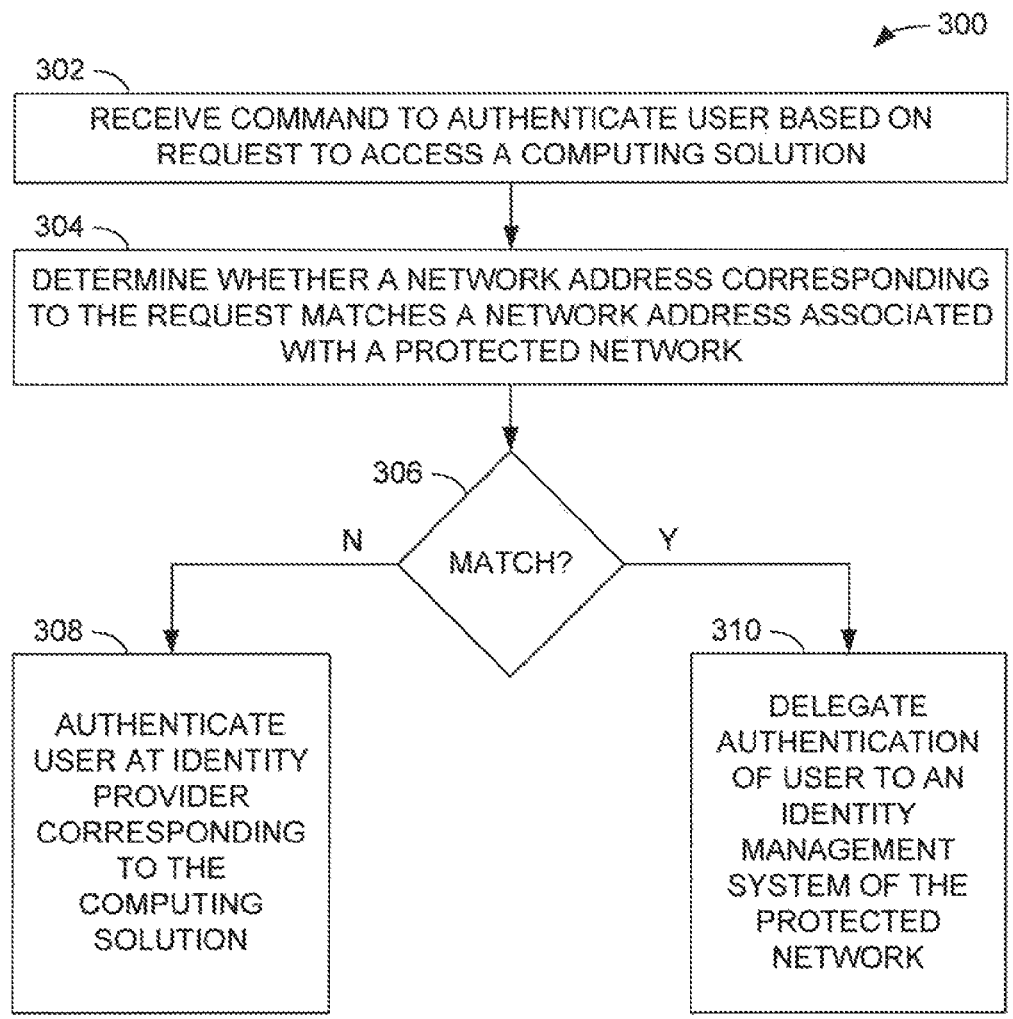
FIG. 3 is a flow diagram illustrating an example method of performing user authentication based on network context.

FIG. 3 is a flow diagram illustrating an example method 300 of performing user authentication based on network context. In one example, the method 300 is performed within the context of the communication system 1 depicted in FIG. 1, although other systems may be employed to perform the method 300 in other implementations. In the method 300, a command to authenticate a user based on a request from a user device 101 or 111 to access a computing solution (e.g., the cloud solution 102) is received (operation 302). In one example, the cloud identity provider 104 may receive the command or instruction from the cloud solution 102, which may issue the command in response to a receiving a request from a user device employed by the user to access the cloud solution 102.

A determination may then be made as to whether a network address corresponding to the request matches a network address associated with a protected network (e.g., the corporate network 110) (operation 304). In one example, the protected network is one that has been granted access to the computing solution being requested. In the environment of the communication system 1 of FIG. 1, for example, the user location determination module 202 determines whether the user device 101 or 111 is located within, or coupled with, the corporate network 110 based on the network address (e.g., an IP address) of the device from which the request is received. In one implementation, the user location determination module 202 maintains, or has access to, one or more network addresses of components within the corporate network 110, such as one or more corporate proxy servers 112, that may serve as a source of access requests to the cloud solution 102 on behalf of user devices 111 within the corporate network 110, and compares these addresses with the network address associated with the access request. In some examples, the one or more network addresses associated with the corporate network 110 may be individual network addresses, one or more ranges of network addresses, and so on. In one example, a system or cloud administrator associated with the cloud solution 102 or the corporate network 110 may specify the addresses with which the comparison is made.

If the network address associated with the request matches one of the network addresses associated with the protected network (operation 306), then authentication of the user associated with the user device may be delegated to an identity management system (e.g., the corporate identity management system 114) of the protected network (operation 310). In reference to FIG. 1, the cloud identity provider 104, having determined that the user device (e.g., user device 111) is within, or connected to, the corporate network 110, may delegate authentication of the associated user to the corporate identity management system 114 of the corporate network 110 via the delegation module 206.

If, instead, the network address associated with the request does not match one of the network addresses associated with the protected network (operation 306), then the user may be authenticated at the identity provider associated with the computing solution (operation 308). Within the environment of FIG. 1, the cloud identity provider 104, via its authentication module 204, may authenticate the user of the user device (e.g., user device 101), either by itself, or in conjunction with one or more additional authentication cloud identity providers in the communication network 100.

While the operations 302 through 310 of the method 300 of FIG. 3 are shown in a specific order, other orders of operation, including possibly concurrent or continual execution of at least portions of one or more operations, may be possible in some implementations of the method 300, as well as other methods discussed herein. For example, users of multiple user devices may be authenticated simultaneously or concurrently in the cloud identity provider 104, the corporate identity management system 114, or both.

In accordance with at least some of the embodiments described above, user authentication for access to a computing solution, such as a cloud solution accessible via the Web, may be based on the network context of the user device being employed to access the cloud solution, such as whether the user device is connected to, or located within, a particular corporate or organizational network. Further, responsibility as to the component or device responsible for authenticating the user may be determined in each case by a cloud identity provider associated with the cloud solution. As a result, the user may utilize the same entry point or web address to access the cloud solution regardless of the location of the user. At the same time, the level or type of authentication to be used may differ depending on whether the user device is connected to the corporate network. Other possible aspects and benefits may be ascertained from the discussion of the various embodiments presented below.

Figure 4:
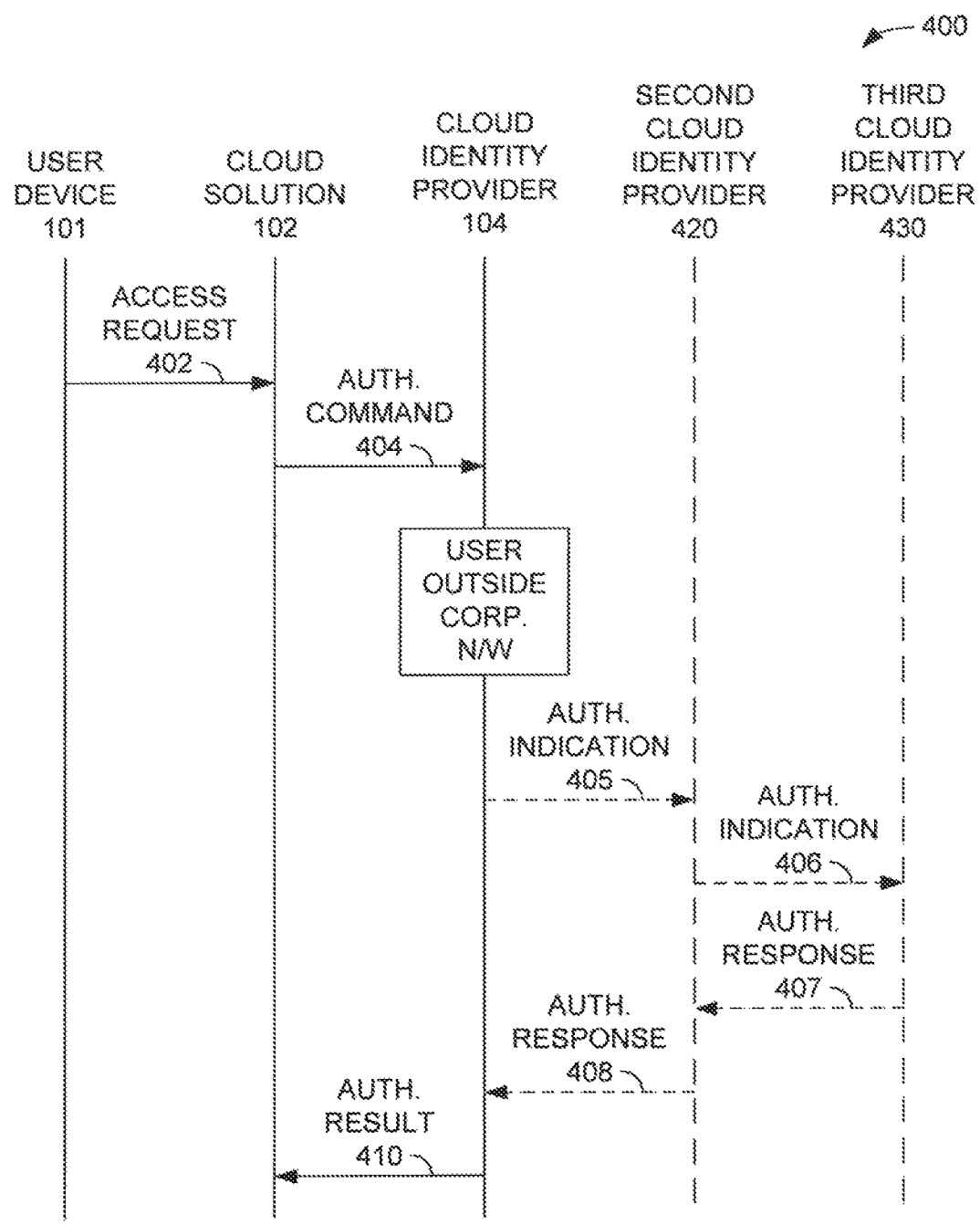
FIG. 4 is a communication diagram illustrating example communications between components of the example communication system of FIG. 1 for performing user authentication when the user is located outside a corporate network.

FIG. 4 is a communication diagram 400 illustrating example communications between components of the communication system 1 of FIG. 1 for performing user authentication when the user is located outside the corporate network 110. The process may begin with an access request 402 for access to the cloud solution 102 from a user device 101 located outside the corporate network 110. In one example, the cloud solution 102 is a solution provided or contracted by an organization or entity with which the user of the user device 101 is associated. For example, the user may be an employee or member of the organization. The access request 402 may be transmitted from the user device 101 via the communication network 100 to the cloud solution 102. In some examples, the cloud solution 102 may detect a network address or other information of the user device 101 indicating whether the source of the access request 402 (e.g., the user device 101) is located within, or coupled to, the corporate network 110.

In response to the access request 402, the cloud solution 102 may issue an authentication command 404 to a cloud identity provider 104 utilized by the cloud solution 102 to authenticate users to ensure they are allowed to access the cloud solution 102, or at least one portion thereof. In one example, the authentication command 404 may be formatted according to an eXtensible Modeling Language (XML), such as the Security Assertion Markup Language (SAML), utilized for the exchanging of authentication and/or authorization data between the cloud solution 102 and the cloud identity provider 104 and/or, as discussed below, between the cloud identity provider 104 and other identity providers. In at least some implementations, the authentication command 404 may include the network address or other information indicating the user device 101 as the source of the access request 402.

In one example, the cloud identity provider 104 may utilize the network address of the source of the access request 402 (e.g., the user device 101) to determine if the user device 101 is located in, or connected with, the corporate network 110 by comparing that network address with one or more network addresses associated with the corporate network 110, such as one or more IP addresses of one or more corporate proxy servers 112 through which users within the corporate network 110 communicate with devices in the communication network 100. Such addresses may be specified individually, in one or more ranges, or in any other format. For example, the user device 101 may exhibit an IP address of 192.168.12.34. Further, data accessible to the cloud identity provider 104 may indicate that the corporate proxy server 112 may have an IP address of 155.56.68.214. Accordingly, the cloud identity provider 104 may determine that the user device 101 associated with the access request 402 is not connected to the cloud solution 102 through the corporate network 110, thus indicating that the cloud identity provider 104 should authenticate the user on behalf of the cloud solution 102.

To perform the authentication of the user, in some embodiments, the cloud identity provider 104 may employ Pluggable Authentication Modules, or PAMs. More specifically, the cloud identify provider 104 may employ a stack of one or more such modules that are to be executed to perform one or more authentication operations. Further, the cloud identity provider 104 may compare user-provided or user device-provider information to particular matching information to verify the identity of the user. In one example, the authentication modules to be employed in a stack may be specified in a configuration file stored in, or provided to, the cloud identity provider 104.

In one example, the cloud identity provider 104 may perform all of the requested authentication, or access data to perform the authentication. In one example, the cloud identity provider 104 may communicate with the user via the user device 101 to request one or more items of identifying information, such as a username, password, or other information mentioned above. This information then may be compared with data stored in, or accessed by, the cloud identity provider 104 to determine if the response data matches data associated with a user that is qualified to access the cloud solution 102.

In some embodiments, instead of the cloud identity provider 104 performing all operations of the user authentication, the cloud identity provider 104 may communicate with a second cloud identity provider 420 in the communication network 100 by way of an authentication indication 405, such as via messages conformation to the SAML 2.0 Identity Provider Proxy mechanism, to enlist the second cloud identity provider 420 to perform at least a portion of the user authentication. In some cases, the second cloud identity provider 420 may also issue a second authentication indication 406 to a third cloud identity provider 430 of the communication network 100, and so on, creating a chain of cloud identity providers, as indicated in a configuration, to perform the authentication functions. In some examples, one or more of the additional cloud identity providers 420 and 430 may communicate directly with the user device 101 to obtain whatever identifying information may be utilized to perform the authentication. While FIG. 3 depicts three cloud identity providers 104, 420, and 430, any number of cloud identity providers greater than or equal to one may be utilized to authenticate the user.

Presuming the use of multiple cloud identity providers 104, 420, and 430, each of these providers may return an authentication response indicating whether the cloud identity provider generating the response has determined that the user is qualified to access the cloud solution 102. For example, as shown in FIG. 4, the third cloud identity provider 430 returns an authentication response 407 in reply to the authentication indication 406 it received, and the second cloud identity provider 420, in response to its authentication indication 405 and the authentication response 407 from the third cloud identity provider 430, may return an authentication response 408 to the original cloud identity provider 104. Thus, the various authentication indications 405 and 406 and responses 407 and 408 may be exchanged in a chain-like fashion from the original cloud identity provider 104 through the second cloud identity provider 420 to the third cloud identity provider 430, and back again.

As a result of the cloud identity provider 104 determining whether the user of the user device 101 is authenticated to access the cloud solution 102, either with or without the involvement of the additional cloud identity providers 420 and 430, the cloud identity provider 104 transmits an authentication result 410, such as a SAML, identity assertion message, to the cloud solution 102 indicating whether the user is qualified to access the cloud solution 102. Based on the authentication result 410, the cloud solution 102 may then provide its services, or some portion thereof, to the user via the user device 101.

Figure 5A:
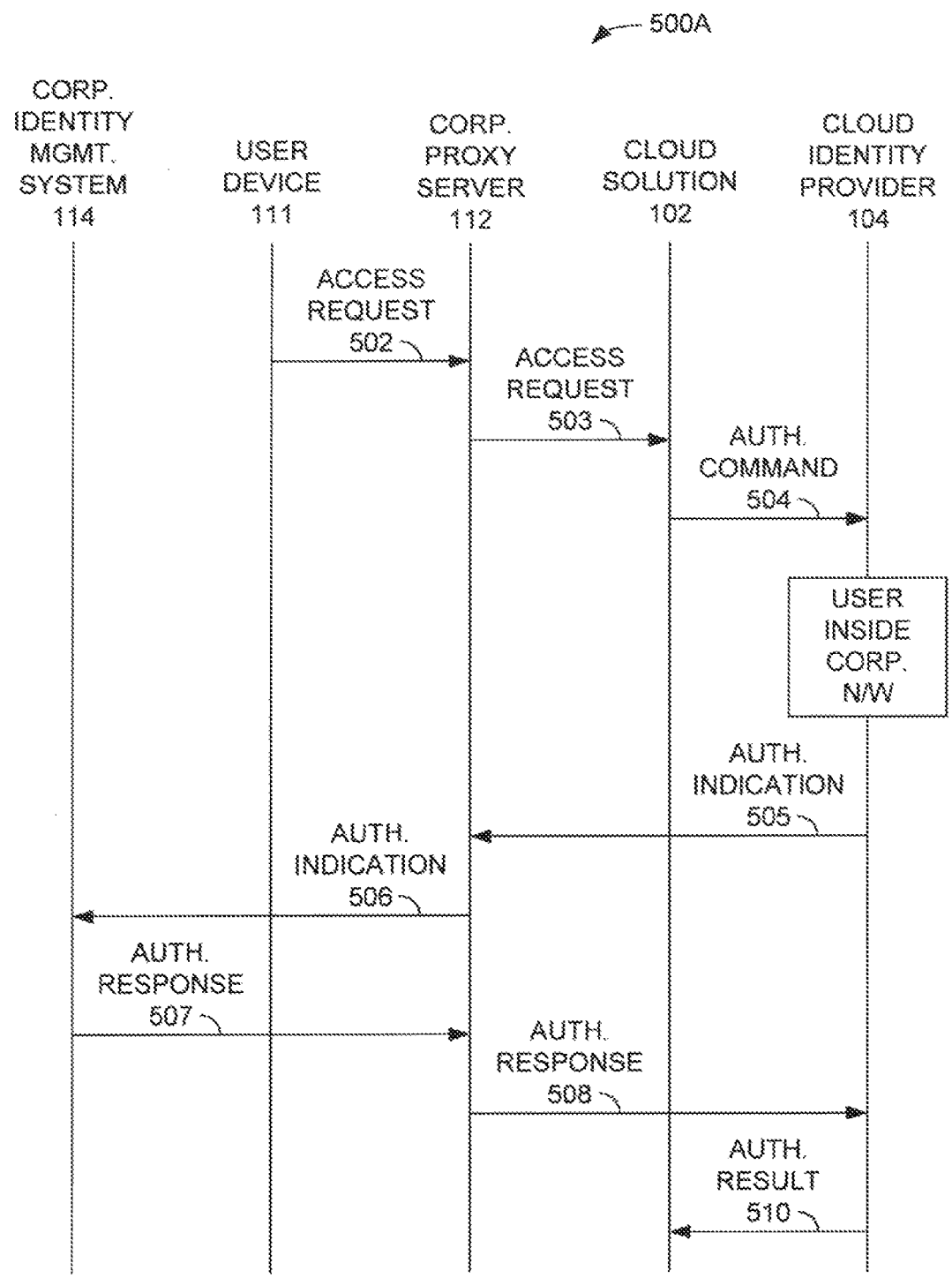
FIGS. 5A, 5B, and 5C are communication diagrams illustrating example communications between components of the example communication system of FIG. 1 for performing user authentication when the user is located inside a corporate network.

FIG. 5A is a communication diagram 500A illustrating example communications between components of the communication system 1 of FIG. 1 for performing user authentication when the user is located inside, or communicatively coupled to, the corporate network 110. In this environment, the process may begin with an access request 502 for access to the cloud solution 102 from the user device 111 located within, or communicatively coupled with, the corporate proxy server 112 located within the corporate network 110. The corporate proxy server 112, in turn, forwards the request as access request 503 to the cloud solution 102 via the communication network 100. In an example, the cloud solution 102 may detect a network address or other information of the corporate proxy server 112 indicating whether the source of the access request 503 (e.g., the corporate proxy server 112) is within the corporate network 110.

In response to the access request 503, the cloud solution 102 may issue an authentication command 504 to the cloud identity provider 104 utilized by the cloud solution 102 to authenticate users to ensure they are allowed to access the cloud solution 102, or at least a portion thereof. As indicated above, the authentication command 504 may be formatted in SAML to exchange authentication and/or authorization data between the cloud solution 102 and the cloud identity provider 104. In at least some embodiments, the authentication command 504 may include the network address or other information indicating the corporate proxy server 112 as the source of the access request 503.

In an example, the cloud identity provider 104 uses the network address of the source of the access request 503 (e.g., the corporate proxy server 112) to determine if the user device 101 is located in, or connected with, the corporate network 110 by comparing that network address with one or more network addresses associated with the corporate network 110. Continuing the example begun in FIG. 4, the corporate proxy server 112 may have an IP address of 155.56.68.214. Accordingly, the cloud identity provider 104 may determine, based on a match of that IP address with the same IP address stored in, or accessed by, the cloud identity provider 104, that a user device 111 associated with the access request 503 is connected to the cloud solution 102 through the corporate network 110, thus indicating that the cloud identity provider 104 should delegate authentication of the user to the corporate identity management system 114 of the corporate network 110. In one example, the cloud identity provider 104 maintains access to an IP address of the corporate identity management system 114 in order to delegate the authentication to that component.

To delegate the authentication of the user, in some embodiments, the cloud identity provider 104 may employ a PAM stack, as indicated above in conjunction with FIG. 4. In one example, the PAM stack associated with delegation of the authentication to the corporate identity management system 114 may be different from the PAM stack associated with the authentication provided by the cloud identity provider 104. More specifically, the PAM stack associated with the corporate identity management system 114 may include more authentication mechanisms than the PAM stack associated with authentication in the cloud identity provider 104. Further, to delegate the authentication, the cloud identity provider 104 may employ the SAML 2.0 Identity Provider Proxy mechanism noted above to communicate with the corporate identity management system 114. This mechanism may be used, for example, to pass the PAM stack and/or other relevant information regarding the one or more authentication mechanisms via an authentication indication 515 from the cloud identity provider 104 to the corporate proxy server 112, which may then forward the indication 515 as authentication indication 506 to the corporate identity management system 114.

In response to the authentication indication 506, the corporate identity management system 114 may compare user-provided or user device-provider information to particular matching information stored in, or accessed by, the corporate identity management system 114 to verify the identity of the user, possibly using the PAM stack described above. Given that the corporate identity management system 114 is located inside the corporate network 110, and thus may be protected by a corporate firewall, the corporate identity management system 114 many include more information regarding the user's identity, the user's role in the organization, and so on, compared to what is available to the cloud identity provider 104, thus allowing the corporate identity management system 114 to perform a more detailed or extensive authentication of the user of the user device 111. As with the cloud identity provider 104, the corporate identity management system 114 may communicate with the user via the user device 111 to request one or more items of identifying information, such as a username, password, or other data mentioned above. This information then may be compared with the data stored in, or accessed by, the corporate identity management system 114 to determine if the response data matches data associated with a user that is qualified to access the cloud solution 102.

After authentication of the user, the corporate identity management system 114 may transmit to the corporate proxy server 112 an authentication response 507, which may then be transmitted as authentication response 508 to the cloud identity provider 104. The cloud identity provider 104, in turn, may provide an authentication result 510, such as a SAML identity assertion message, to the cloud solution 102 indicating whether the user is qualified to access the cloud solution 102. Based on the authentication result 510, the cloud solution 102 may then provide its services, or some portion thereof, to the user via the user device 111.

Figure 5B:
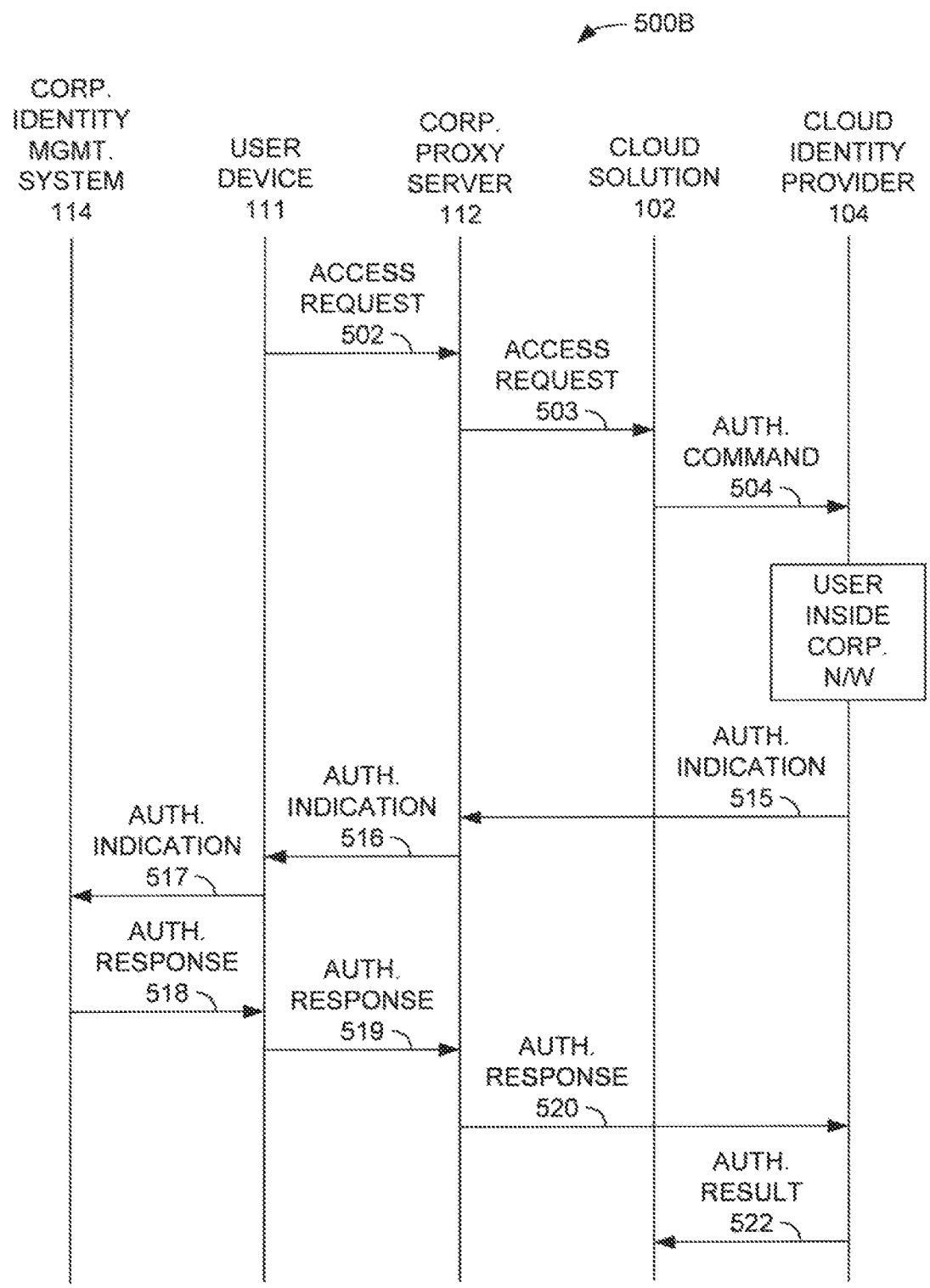

FIG. 5B is a communication diagram 500B illustrating another example of communications between components of the communication system 1 of FIG. 1 for performing user authentication when the user is located inside, or communicatively coupled to, the corporate network 110. In this example, the access requests 502 and 503 and the authentication command 504 are generated, transmitted, and received as described above in conjunction with the communication diagram 500A of FIG. 5A. Presuming the cloud identity provider 104 uses the network address of the source of the access request 503 (e.g., the corporate proxy server 112) to determine that the user device 111 associated with the access request 503 is connected to the cloud solution 102 through the corporate network 110, the cloud identity provider 104 may delegate authentication of the user to the corporate identity management system 114 of the corporate network 110.

However, to delegate the authentication of the user in this example, the cloud identity provider 104 may communicate with the user device 111 to redirect the user device 111 to the corporate identity management system 114. In one implementation, the cloud identity provider 104 may use the SAML 2.0 Identity Provider Proxy mechanism to pass the PAM stack and/or other relevant information regarding the one or more authentication mechanisms via an authentication indication 515 from the cloud identity provider 104 to the corporate proxy server 112, which may then forward the indication 515 as an authentication indication 516 to the user device 111. In turn, the user device 111 may communication directly with the corporate identity management system 114 via an authentication indication 517 using the SAML mechanism to initiate the authentication process.

Once authentication of the user by the corporate identity management system 114 is complete, as described above in conjunction with FIG. 5A, the corporate identity management system 114 may transmit to the user device 111 an authentication response 518 which may then be transmitted as an authentication response 519 to the corporate proxy server 112. The corporate proxy server 112 may then, in turn, transmit authentication response 520 to the cloud identity provider 104, which then may transmit an authentication result 522, such as a SAML identity assertion message, to the cloud solution 102 indicating whether the user is qualified to access the cloud solution 102. Based on the authentication result 522, the cloud solution 102 may then provide its services, or some portion thereof, to the user via the user device 111, as discussed above in connection with FIG. 5A. As a result, the cloud identity provider 104 and the corporate identity management system 114 need not communicate directly via the corporate proxy server 112 for delegation of the authentication process to occur.

Figure 5C:
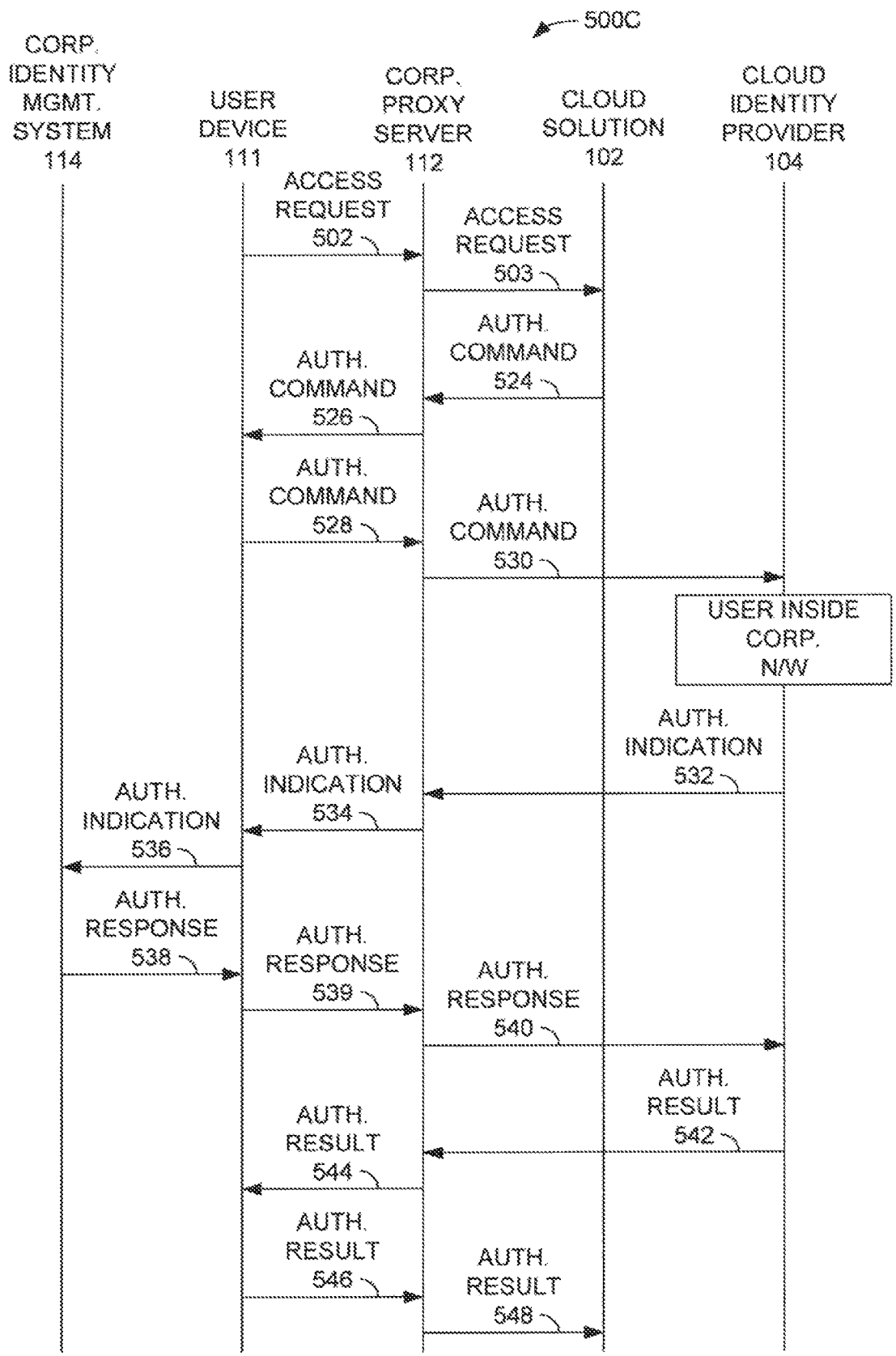

FIG. 5C is a communication diagram 500C illustrating yet another example of communications between components of the communication system 1 of FIG. 1 for performing user authentication when the user is located inside, or communicatively coupled to, the corporate network 110. In this example, the access requests 502 and 503 are generated, transmitted, and received as described above in conjunction with the communication diagram 500A of FIG. 5A. In this example, however, instead of the cloud solution 102 communicating an authorization command directly to the cloud identity provider 104, the cloud solution 102 directs an authorization command 524 via the corporate proxy server 112 to the user device 111 by way of authorization commands 524 and 526. In response, the user device 111 may redirect the received authorization command 526 via the corporate proxy server 112 as authorization commands 528 and 530 to the cloud identity provider 104, thus eliminating direct communication between the cloud solution 102 and the cloud identity provider 104. Presuming the cloud identity provider 104 uses the network address of the source of the access request 503 (e.g., the corporate proxy server 112) to determine that the user device 111 associated with the access request 503 is connected to the cloud solution 102 through the corporate network 110, the cloud identity provider 104 may delegate authentication of the user to the corporate identity management system 114 of the corporate network 110.

To delegate the authentication of the user in this example, the cloud identity provider 104 may communicate with the user device 111 to redirect the user device 111 to the corporate identity management system 114, as described above in connection with FIG. 5B. In one implementation, the cloud identity provider 104 may use the SAML 2.0 Identity Provider Proxy mechanism to pass the PAM stack and/or other relevant information regarding the one or more authentication mechanisms via an authentication indication 532 from the cloud identity provider 104 to the corporate proxy server 112, which may then forward the indication 532 as an authentication indication 534 to the user device 111. In turn, the user device 111 may communicate directly with the corporate identity management system 114 via an authentication indication 536 using the SAML mechanism to initiate the authentication process.

Once authentication of the user by the corporate identity management system 114 is complete, as described above in conjunction with FIG. 5A, the corporate identity management system 114 may transmit to the user device 111 an authentication response 538, which may then be transmitted as an authentication response 539 to the corporate proxy server 112. The corporate proxy server 112 may then, in turn, transmit authentication response 540 to the cloud identity provider 104. At that point, the cloud identity provider 104 may provide an authentication result, such as a SAML identity assertion message, via the corporate proxy server 112 and the user device 111 via authentication result messages 542, 544, 546, and 548 to the cloud solution 102 to indicate whether the user is qualified to access the cloud solution 102. Based on the authentication result 548, the cloud solution 102 may then provide its services, or some portion thereof, to the user via the user device 111, as discussed above in connection with FIGS. 5A and 5B. As a result, the cloud identity provider 104 need not communicate directly with either the cloud solution 102 or the corporate identity management system 114 for delegation of the authentication process to occur.

In yet other examples in which the user device 101 is located outside the corporate network 110, thus indicating that delegation of the authentication process does not occur, authentication response and result messages between the cloud solution 102 and the cloud identity provider 104, such as those depicted in FIG. 4, may instead be redirected through the user device 101, thus negating any direct communication between the cloud solution 102 and the cloud identity provider 104 in a fashion similar to that illustrated in FIG. 5C.

Thus, in view of at least some of the embodiments described herein, the particular authentication mechanisms employed to determine whether a user may access a cloud solution or other network-based software service may be determined by the location of the user relative to a corporate network. More specifically, if the user is to access the cloud solution via the corporate network, the corporate network, by way of its corporate identity management system, may perform the authentication. If the user is instead connected directly to the cloud solution without involvement of the corporate network, a different set of mechanisms employed by a cloud identity provider may be used to authenticate the user. As a result, such a system may allow the user to employ the same entry point for accessing the cloud solution regardless of location, as the determination of which set of authentication mechanisms to deploy is not dependent upon the user employing different entry points according to whether the user is using the corporate network. Also, by allowing two different sets of authentication mechanisms, full replication of the user identification data accessible by the corporate identity management system need not be duplicated at the cloud identity provider, thus allowing this data to remain protected behind any firewalls or other protections mechanisms provided by the corporate network.

Figure 6:
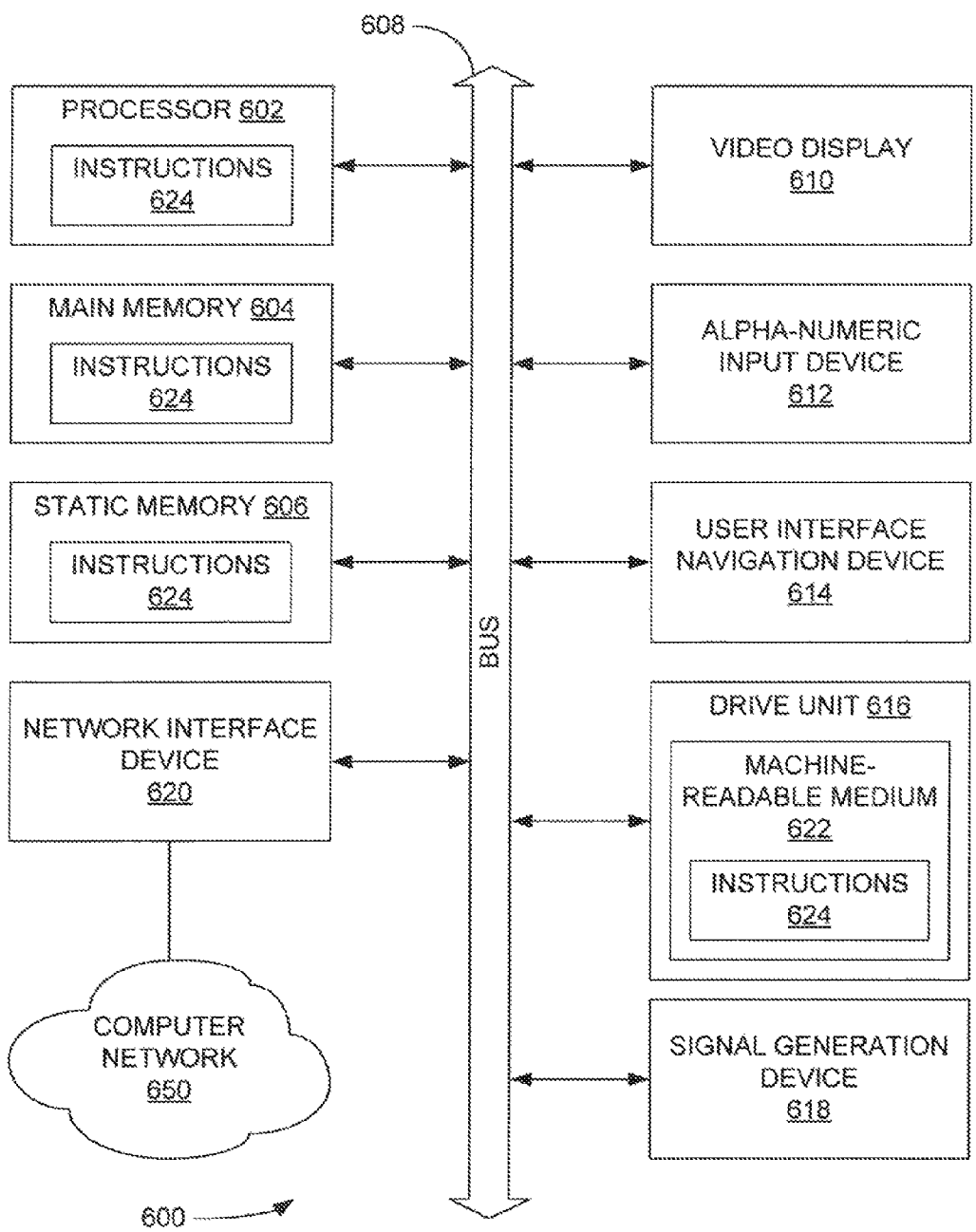
FIG. 6 is a block diagram of a machine in the example form of a processing system within which may be executed a set of instructions for causing the machine to perform any one or more of the methodologies discussed herein.

FIG. 6 depicts a block diagram of a machine in the example form of a processing system 600 within which may be executed a set of instructions 624 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 600 includes a processor 602 (e.g., a central processing unit (CPU), a graphics processing unit (GPU), or both), a main memory 604 (e.g., random access memory), and static memory 606 (e.g., static random-access memory), which communicate with each other via bus 608. The processing system 600 may further include video display unit 610 (e.g., a plasma display, a liquid crystal display (LCD), or a cathode ray tube (CRT)). The processing system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 (a type of non-volatile memory storage) includes a machine-readable medium 622 on which is stored one or more sets of data structures and instructions 624 (e.g., software) embodying or utilized by any one or more of the methodologies or functions described herein. The data structures and instructions 624 may also reside, completely or at least partially, within the main memory 604, the static memory 606, and/or within the processor 602 during execution thereof by processing system 600, with the main memory 604 and processor 602 also constituting machine-readable, tangible media.

The data structures and instructions 624 may further be transmitted or received over a computer network 650 via a network interface device 620 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 600) or one or more hardware modules of a computer system (e.g. a processor 602 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 602 that is configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine but deployed across a number of machines. In some example embodiments, the processors 602 may be located in a single location (e.g., within a home environment, within an office environment, or as a server farm), while in other embodiments, the processors 602 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising: receiving, in response to a request transmitted from a computing device to access a computing solution, a command to authenticate a user of the computing device;
   determining, in response to receiving the command, whether a network address corresponding to the request matches at least one network address associated with a protected network;
   initiating, in response to the network address corresponding to the request not matching the at least one network address associated with the protected network, authentication of the user via a first number of authentication mechanisms defined via a stack of pluggable authentication modules at an identity provider corresponding to the computing solution; and delegating, in response to the network address corresponding to the request matching the at least one network address associated with the protected network, the authentication of the user via a second number, that is greater than the first number, of authentication mechanisms defined via a stack of pluggable authentication modules to an identity management system located within the protected network.

2. The method of claim 1, the at least one network address associated with the protected network comprising one of a single network address, a range of network addresses, and a list of ranges of network addresses.

3. The method of claim 1, the at least one network address associated with the protected network comprising a network address of a proxy server of the protected network.

4. The method of claim 1, at least one of the identity provider and the identity management system providing the authentication of the user using a security assertion markup language.

5. The method of claim 1, the delegating of the authentication of the user to the identity management system located within the protected network being performed using an identity provider proxy mechanism.

6. The method of claim 1, wherein the at least one authentication mechanism provided by the identity provider is different than the at least one authentication mechanism provided by the identity management system.

7. The method of claim 1, the initiating of the authentication of the user via the identity provider comprising forwarding at least a portion of the authentication from the identity provider to a second identity provider.

8. A system comprising:
   at least one hardware processor;
   a user location determination module executable using the at least one hardware processor, configured to:
   receive, in response to a request transmitted from a computing device to access a computing solution, a command to authenticate a user of the computing device; and
   determine, in response to receiving the command, whether a network address corresponding to the request matches at least one network address associated with a protected network;
   an authentication module comprising an identity provider executable using the at least one hardware processor, configured to authenticate the user via a first number of authentication mechanisms defined by a stack of pluggable authentication modules, at the identity provider corresponding to the computing solution, in response to the network address corresponding to the request not matching the at least one network address associated with the protected network; and
   a delegation module executable using the at least one hardware processor, configured to delegate, in response to the network address corresponding to the request matching the at least one network address associated with the protected network, the authentication of the user via a second number, that is greater than the first number, of authentication mechanisms defined by a stack of pluggable authentication modules to an identity management system located within the protected network.

9. The system of claim 8, wherein the authentication module further configured to employ at least one additional identity provider external to the system to authenticate the user.

10. The system of claim 8, the computing solution providing a single entry point for access to the computing solution via computing devices located within the protected network and outside the protected network.

11. The system of claim 8, the at least one network address associated with the protected network comprising one of a single Internet Protocol (IP) address, a range of IP addresses, and a list of ranges of IP addresses.

12. The system of claim 8, the at least one network address associated with the protected network comprising a network address of a proxy server of the protected network.

13. The system of claim 8, wherein the at least one authentication mechanism provided by the identity provider is different than the at least one authentication mechanism provided by the identity management system.

14. The system of claim 8, the network address corresponding to the request comprising a network address of a communication device from which the request was received at the computing solution.

15. A non-transitory computer-readable storage medium including instructions that, when executed by at least one processor of a machine, cause the machine to perform operations comprising:
   receiving, from a computing solution in response to a request transmitted from a computing device to access the computing solution, a command to authenticate a user of the computing device, the command including a network address of a communication device from which the request was received at the computing solution;
   determining whether the network address corresponding to the request matches at least one network address associated with a protected network;
   initiating, in response to the network address corresponding to the request not matching the at least one network address associated with the protected network, authentication of the user via a first number of authentication mechanisms defined by a stack of pluggable authentication modules an identity provider corresponding to the computing solution; and
   in response to the network address corresponding to the request matching the at least one network address associated with the protected network, delegating the authentication of the user via a second number, that is greater than the first number, of authentication mechanisms defined via a stack of pluggable authentication modules to an identity management system located within the protected network.

\* \* \* \* \*